(12) United States Patent
Lauersdorf et al.

(10) Patent No.: US 7,118,699 B2
(45) Date of Patent: Oct. 10, 2006

(54) METHOD OF MAKING A COMPOSITE WITH A BARRIER LAYER IN A CLOSED MOLD PROCESS

(75) Inventors: William F. Lauersdorf, Loveland, OH (US); Robert Phillip Anderson, Westchester, OH (US)

(73) Assignee: Illinois Tool Works Inc., Glenview, IL (US)

( * ) Notice: Subject to any disclaimer, the term of this patent is extended or adjusted under 35 U.S.C. 154(b) by 233 days.

(21) Appl. No.: 10/643,048

(22) Filed: Aug. 18, 2003

(65) Prior Publication Data

US 2004/0033347 A1    Feb. 19, 2004

Related U.S. Application Data

(63) Continuation-in-part of application No. 10/262,853, filed on Oct. 2, 2002, which is a continuation-in-part of application No. 09/799,211, filed on Mar. 5, 2001, now Pat. No. 6,463,871.

(51) Int. Cl.
    *B27N 3/10*   (2006.01)
(52) U.S. Cl. ....................... 264/255; 264/257
(58) Field of Classification Search .............. None
    See application file for complete search history.

(56) References Cited

U.S. PATENT DOCUMENTS

| | | | |
|---|---|---|---|
| 1,568,832 A | 1/1926 | Harrison et al. | |
| 2,980,153 A | 4/1961 | Burch | |
| 3,372,408 A | 3/1968 | Luger et al. | |
| 3,619,228 A | 11/1971 | Hallonquist et al. | |
| 4,222,926 A | 9/1980 | Mizuno et al. | |
| 4,288,571 A * | 9/1981 | Comstock et al. | 525/170 |
| 4,760,811 A | 8/1988 | Hopper | |
| 5,036,788 A | 8/1991 | Unger | |
| 5,192,809 A | 3/1993 | Jones et al. | |
| 5,204,033 A | 4/1993 | Pearce et al. | |

(Continued)

FOREIGN PATENT DOCUMENTS

FR    1374860    8/1964

OTHER PUBLICATIONS

Certified Composites Technician-Marine; Composites Manufacturing Processes, Study Module 2 Topics, 2001 Composites Fabricators Association, pp. 2-1-2-7 and 4-6.

(Continued)

*Primary Examiner*—Richard Crispino
*Assistant Examiner*—Barbara J Musser
(74) *Attorney, Agent, or Firm*—Dinsmore & Shohl LLP

(57)    ABSTRACT

A closed mold method of making a composite having a barrier layer. The method includes providing a mold; applying and curing a layer of gel coat on an inside surface of the mold; applying and curing a layer of barrier composition over the gel coat, the barrier composition comprising: about 10 to about 50 wt % vinyl ester resin, about 15 to about 60 wt % polyester resin, 0 to about 30 wt % monomer, about 1 to about 15 m wt % thickening agent, about 0.1 to about 5 wt % accelerators, about 1 to about 25 wt % filler, and a catalyst; applying a layer of fiberglass reinforcement over the barrier composition; applying resin to the fiberglass reinforcement; closing the mold; curing the resin; and opening the mold and removing the composite, wherein the composite has an improved surface finish compared to a composite without the barrier composition made with a closed mold process. The invention also relates to the composite made by the method.

19 Claims, 1 Drawing Sheet

U.S. PATENT DOCUMENTS

| | | | |
|---|---|---|---|
| 5,207,172 A | 5/1993 | Wolter | |
| 5,244,941 A | 9/1993 | Bruckbauer et al. | |
| 5,266,245 A | 11/1993 | Wellings | |
| 5,277,145 A | 1/1994 | Hordis | |
| 5,372,763 A | 12/1994 | Hordis | |
| 5,457,152 A | 10/1995 | Gaa et al. | |
| 5,521,232 A | 5/1996 | Gynn et al. | |
| 5,522,340 A * | 6/1996 | Skogman | 114/357 |
| 5,549,969 A | 8/1996 | Parish | |
| 5,601,049 A | 2/1997 | Hordis et al. | |
| 5,613,342 A | 3/1997 | Nelson | |
| 5,628,949 A | 5/1997 | Bordener | |
| 5,747,154 A | 5/1998 | Minghetti et al. | |
| 5,758,594 A | 6/1998 | Siewert | |
| 5,843,221 A * | 12/1998 | Parish | 106/469 |
| 5,853,650 A | 12/1998 | Lonno et al. | |
| 5,865,231 A | 2/1999 | Korhonen et al. | |
| 5,885,503 A | 3/1999 | Bordener | |
| 5,900,311 A * | 5/1999 | Campanella et al. | 428/215 |
| 5,904,986 A | 5/1999 | Smith | |
| 5,976,670 A | 11/1999 | Fugazzi | |
| 6,032,606 A | 3/2000 | Fulks | |
| 6,153,682 A | 11/2000 | Bannat et al. | |
| 6,155,021 A | 12/2000 | Swingle | |
| 6,177,499 B1 | 1/2001 | Minghetti | |
| 6,218,458 B1 | 4/2001 | Vidaurre et al. | |
| 6,265,027 B1 | 7/2001 | Johnston et al. | |
| 6,406,659 B1 | 6/2002 | Lang et al. | |
| 6,558,608 B1 * | 5/2003 | Haraldsson et al. | 264/516 |
| 2004/0038059 A1 * | 2/2004 | Kia et al. | 428/515 |

OTHER PUBLICATIONS

Certified Composites Technician-Marine; Composites Materials for Boat Building, Study Module 3 Topics, 2001 Composites Fabricators Association, pp. 3-1-3-10 and 12-17.

Certified Composites Technician-Marine; Marine Laminating Techniques Study Module 5 Topics, 2001 Composites Fabricators Association, pp. 5-1-5-13 and 2-19.

* cited by examiner

METHOD OF MAKING A COMPOSITE WITH A BARRIER LAYER IN A CLOSED MOLD PROCESS

CROSS-REFERENCE TO RELATED APPLICATIONS

The present application is a continuation-in-part of application Ser. No. 10/262,853 filed Oct. 2, 2002, entitled "Method of Making a Sheet of Building Material", which is a continuation-in-part of application Ser. No. 09/799,211 filed Mar. 5, 2001, entitled "Wood Replacement System and Method," now U.S. Pat. No. 6,463,871, the disclosures of which are hereby incorporated by reference.

BACKGROUND OF THE INVENTION

This invention relates generally to closed mold processes, and more particularly to a closed mold method of making a composite having a barrier layer, and to a composite made by the method.

Fiberglass parts are widely used in many products. However, the glass fibers are often visible in the surface finish of such parts, which can be undesirable for some applications. In addition, water permeation into a fiberglass part can create structural problems, weakening the part. It can also cause cosmetic problems on the surface, such as blistering.

Therefore, there is a need for fiberglass parts having one or more barrier layers and an improved surface finish, and for a method of making such parts.

SUMMARY OF THE INVENTION

The present invention meets this need by providing a closed mold method of making a composite having a barrier layer. The method includes providing a mold; applying and curing a layer of gel coat on an inside surface of the mold; applying and curing a layer of barrier composition over the gel coat, the barrier composition comprising: about 10 to about 50 wt % vinyl ester resin, about 15 to about 60 wt % polyester resin, 0 to about 30 wt % monomer, about 1 to about 15 wt % thickening agent, about 0.1 to about 5 wt % accelerators, about 1 to about 25 wt % filler, and a catalyst; applying a layer of fiberglass reinforcement over the barrier composition; applying resin to the fiberglass reinforcement; closing the mold; curing the resin; and opening the mold and removing the composite, wherein the composite has an improved surface finish compared to a composite made with a closed mold process without the barrier composition.

In one embodiment, the mold is a two piece mold, and the mold is closed by moving the two pieces together. The method can include applying pressure to the mold. In some processes, the resin is applied after the mold is closed, and the resin is applied under pressure. A vacuum can be applied after the mold is closed.

In another embodiment, the mold is closed by sealing a vacuum bag around the mold. The method can include applying a vacuum to the vacuum bag. The resin can be applied after the vacuum is applied.

The closed mold method can be a closed mold process including, but not limited to, compression molding, vacuum bag molding, vacuum infusion molding, and resin transfer molding.

Another aspect of the invention is a composite having an improved surface finish made by the claimed process.

DETAILED DESCRIPTION OF THE INVENTION

Figure 1:
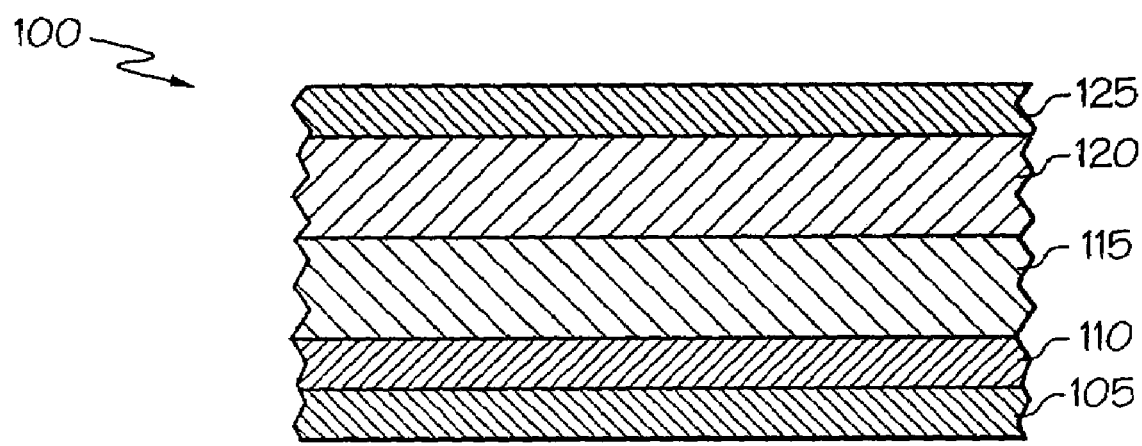
FIG. 1 is a cross-section of one embodiment of the composite of the present invention.

The present invention provides a closed mold method of making a composite having a barrier layer.

FIG. 1 shows a composite 100 made by the method of the present invention. The composite 100 includes a layer of gel coat 105. The layer of gel coat 105 is generally in the range of about 20 to about 30 mils thick. There is a layer of a barrier composition 110 over the gel coat 105. The layer of barrier composition is generally in the range of about 25 to about 35 mils thick. There is a layer of resin impregnated fiberglass 115 over the barrier composition 110.

There can be a second layer of resin impregnated fiberglass 120 over the layer of resin impregnated fiberglass 115. The thickness of the layers of resin impregnated fiberglass 115 and 120, and the thickness of the overall composite 100 will vary depending on the physical properties required for the part. Additional layers of resin impregnated fiberglass can be added to obtain the desired thickness.

There can be a second layer of barrier composition 125 over the second layer of resin impregnated fiberglass 120. Alternatively, the second layer of barrier composition could be over the layer of resin impregnated fiberglass 115, or over another layer of resin impregnated fiberglass. There could be additional layers of resin impregnated fiberglass over the second layer of barrier composition, if desired. Additional layers of barrier composition can be included, if desired.

The second layer of barrier composition 125 can have a wood or a core material embedded in it, if desired.

The barrier layer provides an osmotic barrier for the composite. It also helps improve the surface finish of the composite.

The method of the present invention includes providing a mold; applying and curing a layer of gel coat on an inside surface of the mold; applying and curing a layer of barrier composition over the gel coat, the barrier composition comprising: about 10 to about 50 wt % vinyl ester resin, about 15 to about 60 wt % polyester resin, 0 to about 30 wt % monomer, about 1 to about 15 wt % thickening agent, about 0.1 to about 5 wt % accelerators, about 1 to about 25 wt % filler, and a catalyst; applying a layer of fiberglass reinforcement over the barrier composition; applying resin to the fiberglass reinforcement; closing the mold; curing the resin; and opening the mold and removing the composite, wherein the composite has an improved surface finish compared to a composite made with a closed mold process without the barrier composition.

Suitable closed molding processes include, but are not limited to, compression molding, vacuum bag molding, vacuum infusion molding, and resin transfer molding.

Compression molding is a high volume, high pressure method suitable for molding complex, fiberglass-reinforced parts. The mold set is mounted on a hydraulic or mechanical molding press. A layer of gel coat is applied to the inside surface of the mold and cured. The layer of gel coat can be applied by any suitable process, including, but not limited to, spraying, pouring, brushing, or using a roller. The layer of barrier composition is applied over the gel coat and cured. The layer of composition can be applied by any suitable process including, but not limited to, spraying, pouring, brushing, or using a roller.

A layer of fiberglass reinforcement is applied over the barrier composition. The layer of fiberglass reinforcement can be applied by a process including, but not limited to, manually placing roll stock fiberglass in the mold, spraying chopped fiberglass into the mold, or other suitable process. The resin is applied over the layer of fiberglass reinforcement and thoroughly wets the fiberglass reinforcement. The resin can be applied by processes including, but not limited to, pouring, brushing, spraying, or using a roller. The mold is then closed. A cold mold process can be used in which the process is performed at about ambient temperature and pressure. Alternatively, a hot mold process can be used. In the hot mold process, the mold is generally heated to a temperature in the range of about 25° C. to about 140° C., depending on the resin used. The pressure is generally in the range of about 2,000 psi to about 20,000 psi. Depending on the thickness, size, and shape of the part, the curing time for the resin is generally in the range of about 4 minutes to about 60 minutes.

Resin transfer molding also involves the use of a two piece mold. A layer of gel coat is applied to the inside surface of the mold. The barrier composition is applied over the gel coat and cured. A layer of fiberglass reinforcement is applied over the barrier composition. The mold is then closed and clamped. Resin is injected into the cavity under pressure. The molds are generally heated to a temperature in the range of about 25° C. to about 100° C. The pressure is generally in the range of about 14 psi to about 50 psi. Depending on the thickness, size, and shape of the part, the curing time for the resin is generally in the range of about 10 minutes to about 45 minutes.

Vacuum bag molding is an improvement on open molding processes. A layer of gel coat in applied to the inside surface of the mold. The barrier composition is applied over the gel coat and cured. A layer of fiberglass reinforcement is applied over the barrier composition, and a layer of resin is applied over the fiberglass. A flexible film, such as nylon, polyester, or polyethylene, is then placed over the mold, the edges are sealed, and a vacuum is drawn. The molds are generally at ambient temperature. The vacuum is generally in the range of about 25 to about 28 in Hg. Depending on the thickness, size, and shape of the part, the curing time for the resin is generally in the range of about 20 minutes to about 60 minutes.

Vacuum infusion molding is a variation of vacuum bag molding in which the resin is introduced into the mold after the vacuum has been applied. In this case, the gel coat is applied to the mold and cured, and the barrier composition is applied over the gel coat and cured. The fiberglass reinforcement is applied over the barrier composition. The flexible film is placed over the mold, the edges are sealed, and a vacuum is drawn. The resin is then introduced into the mold. The processing conditions are similar to those for vacuum bag molding.

The curing time for the layer of gel coat is generally in the range of about 1 to about 2 hours. The curing time for the layer of barrier composition is generally in the range of about 45 minutes to about 60 minutes.

In any of the processes, one or more additional layers of resin impregnated fiberglass can be added to obtain a thicker composite, as needed. These layers can be applied using the closed mold processes described.

One or more additional layers of barrier composition can be applied over the first layer of resin impregnated fiberglass, or any subsequent layer(s) of resin impregnated fiberglass to provide additional barrier protection. In addition, wood or a coring material can be embedded in the additional layer(s) of barrier composition, if desired. Additional layers of resin impregnated fiberglass can be applied over the additional layer(s) of barrier composition, if desired.

Gel coats are well known materials and comprise resins which become an integral part of the product. Any standard gel coat used for a particular application could be used for the same application with the layer of barrier composition of the present invention. Gel coats include, but are not limited to, polyesters, vinyl esters, epoxies, acrylics, and the like.

The barrier composition includes a combination of polyester resin and vinyl ester resin. Typically, the barrier composition includes between about 15 to about 60 wt % polyester resin and between about 10 to about 50 wt % vinyl ester resin. (All percentages are based on the total weight of the barrier composition.)

The barrier composition optionally includes a monomer in an amount of between 0 to about 30 wt %. The monomer can be any suitable monomer, such as a styrene monomer. It is typically present in an amount of between about 5 to about 30 wt %. If a low volatile organic compound (VOC) is desired, the styrene monomer can be used in amounts at the lower end of the range. Alternatively, a non-styrenic, VOC-compliant material can be used.

The barrier composition includes a thickening agent, such as thixotropic clay. The thickening agent is generally present in an amount of between about 1 to about 15 wt %.

The barrier composition also includes one or more accelerators. The accelerators are generally present in an amount of between about 0.1 to about 5 wt %. Typical accelerators include, but are not limited to, dimethyl para-toluidine, dimethyl aniline, diethyl aniline (DEA), dimethyl acetalacetamide, cobalt octoate, potassium octoate, copper naphthanate, quaternary ammonium salts, or mixtures thereof.

The barrier composition also includes one or more fillers, which are usually present in an amount of between about 1 to about 25 wt %. Typical fillers include, but are not limited to, hollow spheres or microspheres, wollastonite fibers, mica, potassium aluminum silicate, calcium silicate, calcium sulfate, aluminum trihydrate, or combinations thereof. Suitable hollow spheres or microspheres can be made of materials including, but not limited to, silicate glass, ceramic, or plastic, or combinations thereof.

The barrier composition may optionally include fumed silica. The fumed silica is generally present in an amount of between 0 and about 3% by weight, typically between 0 and about 2% by weight of the total composition.

The barrier composition can be made by mixing the polyester resin, vinyl ester resin, optional monomer, and thickening agent in a conventional mixer. The fumed silica, if present, can be added initially or after the first mixing step. The accelerators are added and mixed, typically for about 5 minutes. The fillers are then added and mixed into the composition for about 20 minutes to form the barrier composition.

The barrier composition can optionally be filtered through a mesh filter, if desired.

A catalyst can be added to the barrier composition, either before final mixing or during spraying of the composition onto the molding surface. Suitable catalysts include, but are not limited to, methyl ethyl ketone peroxide, benzoyl peroxide, or cumyl hydroperoxide.

One typical barrier composition includes about 10 to about 20% vinyl ester resin, about 40 to about 60% polyester resin, about 5 to about 10% monomer, about 1 to about 15% thickening agent, 0 to about 2% fumed silica, about 0.1 to about 5% accelerators, about 1 to about 25% fillers, and a catalyst.

Another typical barrier composition includes about 20 to about 50% vinyl ester resin, about 15 to about 40% polyester resin, about 5 to about 10% monomer, about 1 to about 15% thickening agent, 0 to about 2% fumed silica, about 0.1 to about 5% accelerators, about 1 to about 25% fillers, and a catalyst.

Composites made by the closed mold processes of the present invention were compared to composites made by closed molding processes without the barrier composition. The number of surface defects and their severity were evaluated visually. Composites made with the barrier composition using compression molding and vacuum infusion molding had fewer and less severe surface defects compared to those made without the barrier composition using the same processes.

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. A closed mold method of making a composite having a barrier layer, the method comprising:
   providing a mold;
   applying and curing a layer of gel coat on an inside surface of the mold;
   applying end curing a layer of barrier composition over the cured gel coat, the barrier composition comprising:
      about 10 to about 50 wt % vinyl ester resin;
      about 15 to about 60 wt % polyester resin;
      0 to about 30 wt % monomer;
      about 1 to about 15 wt % thickening agent;
      about 0.1 to about 5 wt % accelerators;
      about 1 to about 25 wt % filler; and
      a catalyst;
   applying a layer of fiberglass reinforcement over the cured barrier composition;
   applying resin to the fiberglass reinforcement;
   closing the mold;
   curing the resin; and
   opening the mold and removing the composite,
   wherein the composite has an improved surface finish compared to a composite
   made with a closed mold process without the barrier composition.

2. The method of claim 1 wherein the mold is a two piece mold, and wherein the mold is closed by moving the two pieces together.

3. The method of claim 2 further comprising applying pressure to the mold.

4. The method of claim 2 wherein the resin is applied after the mold is closed, and wherein the resin is applied under pressure.

5. The method of claim 4 wherein a vacuum is applied after the mold is closed.

6. The method of claim 1 wherein the mold is closed by sealing a vacuum bag around the mold.

7. The method of claim 6 further comprising applying a vacuum to the vacuum bag.

8. The method of claim 7 wherein the resin is applied after the vacuum is applied.

9. The method of claim 1 wherein the closed mold method is a closed mold process selected from compression molding, vacuum bag molding, vacuum infusion molding, or resin transfer molding.

10. The method of claim 1 wherein the accelerators comprise at least one material selected from dimethyl paratoluidine, diniethyl aniline, diethyl aniline, dimethyl acetalacetamide, cobalt octoate, potassium octoate, copper naplflhanate, quaternary arnmonium salts, or mixtures thereof.

11. The method of claim 1 wherein the fillers comprise a material selected from hollow spheres or microspheres, wollastonite fibers, mica, potassium aluminum silicate, calcium silicate, calcium sulfate, aluminum tribydrate, or combinations thereof.

12. The method of claim 11 wherein the hollow spheres or niicrospheres comprise a material selected from silicate glass, ceramic, plastic, or combinations thereof.

13. The method of claim 1 wherein said thickening agent is a thixotropic clay.

14. The method of claim 1 further including fumed silica.

15. The method of claim 1, wherein the catalyst is selected from methyl ethyl ketone peroxide. benzoyl peroxide, or cumyl hydroperoxide.

16. The method of claim 1, wherein the barrier composition comprises:
   about 10 to about 20 wt % vinyl ester resin;
   about 40 to about 60 wt % polyester resin;
   about 5 to about 10 wt % monomer;
   about 1 to about 15 wt % thickening agent;
   0 to about 2 wt % fumed silica;
   about 0.1 to about 5 wt % accelerators; and
   about 1 to about 25 wt % fillers.

17. The method of claim 1, wherein the barrier composition comprises:
   about 20 to about 50 wt % vinyl ester resin;
   about 15 to about 40 wt % polyester resin;
   about 5 to about 10 wt % monomer;
   about 1 to about 15 wt % thickening agent;
   0 to about 2 wt % fumed silica;
   about 0.1 to about 5 wt % accelerators; and
   about 1 to about 25 wt % fillers.

18. The method of claim 1, further comprising applying a second layer of fiberglass reinforcement, applying resin to the second layer of fiberglass reinforcement, and curing the resin.

19. The method of claim 1, further comprising applying and curing a second layer of barrier composition.

* * * * *

UNITED STATES PATENT AND TRADEMARK OFFICE
CERTIFICATE OF CORRECTION

PATENT NO. : 7,118,699 B2
APPLICATION NO. : 10/643048
DATED : October 10, 2006
INVENTOR(S) : Lauersdorf et al.

It is certified that error appears in the above-identified patent and that said Letters Patent is hereby corrected as shown below:

Column 5, Line 28 "end" should read --and--

Column 6, Line 13 "dinethyl" should read --dimethyl--

Column 6, Line 14 "naplflhanate" should read --naphthanate--

Column 6, Line 15 "arnmonium" should read --ammonium--

Column 6, Line 19 "tribydrate," should read --trihydrate,--

Column 6, Line 22 "niicrospheres" should read --microspheres--

Column 6, Line 28 "methyl ethyl ketone peroxide" should read --methyl ethyl ketone peroxide,--

Signed and Sealed this

Twenty-fourth Day of April, 2007

JON W. DUDAS
*Director of the United States Patent and Trademark Office*